(No Model.)
E. RIVETT.
UNIVERSAL DETACHABLE HANDLE.
No. 594,285. Patented Nov. 23, 1897.
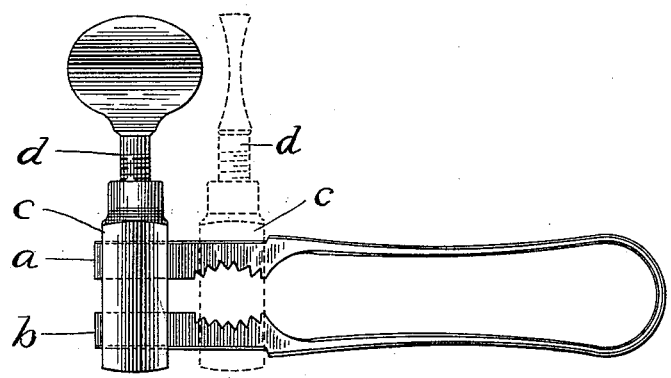
Fig. 1.
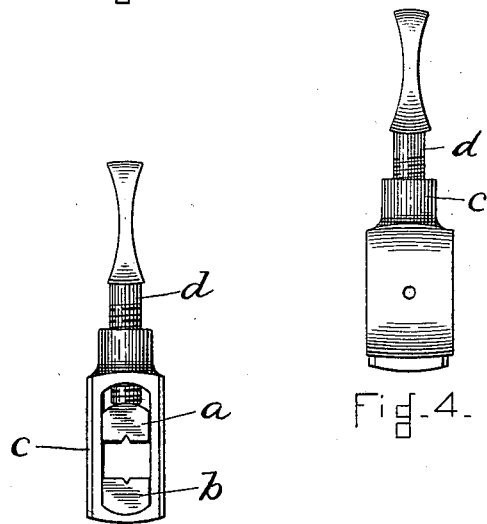
Fig. 2.
Fig. 4.
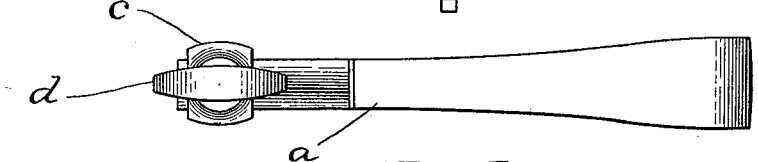
Fig. 3.
Witnesses
Edmund A. Bates.
Harry O. Robinson.
Inventor
Edward Rivett.
by his Attorney

UNITED STATES PATENT OFFICE.

EDWARD RIVETT, OF BOSTON, MASSACHUSETTS.

UNIVERSAL DETACHABLE HANDLE.

SPECIFICATION forming part of Letters Patent No. 594,285, dated November 23, 1897.

Application filed February 2, 1897. Serial No. 621,690. (No model.)

*To all whom it may concern:*

Be it known that I, EDWARD RIVETT, of Boston, county of Suffolk, State of Massachusetts, have invented an Improvement in Universal Detachable Handles, of which the following description, in connection with the accompanying drawings, is a specification, like letters on the drawings representing like parts.

This invention has for its object to improve the construction of universal detachable handles adapted to receive and hold tools of different descriptions, and also for so constructing such a handle that it may be used as a pipe-wrench and as a rod or wire holder.

In accordance with this invention a pair of jaws adapted to receive and hold tools of different descriptions are formed on the ends of a loop-like spring-acting handle and a notch is formed in the adjacent face of each jaw, which extends lengthwise, and a hole is formed at the rear end of said loop-like handle in line with said notches, and an elongated loop embraces or incloses said jaws, through one end of which passes a screw which impinges upon one of said jaws, acting when turned in to press the jaws toward each other and when turned out to permit said jaws to separate. The spring-acting jaws are also formed upon their adjacent faces each with a small curved recess which is provided with teeth, and the jaws when thus formed may engage a pipe and be thereby used as a pipe-wrench.

Figure 1 shows in side elevation a universal detachable tool-handle embodying this invention; Fig. 2, an end view of the same; Fig. 3, a plan view of the same, and Fig. 4 an end view.

The jaws $a$ $b$ are formed on the ends of a loop-like spring-acting handle—as, for instance, they may be made of spring-steel and formed integral with said handle. The jaws are preferably made alike, and their adjacent faces are each formed with a notch running lengthwise to better adapt them to receive between them and hold different tools. The loop-like handle has at its rear end a hole in line with the notches which extend lengthwise said jaws, enabling a rod or wire to be passed through said hole and grasped by the jaws. The jaws also each have a curved recess which is provided with teeth in order that they may engage a pipe. These jaws are embraced by or inclosed in an elongated loop $c$, said loop being wide enough for the free movement of the jaws and long enough to permit said jaws to separate a short distance. A screw $d$ passes through said loop $c$ at one end, which impinges upon one of said jaws, and by turning said screw in the jaws will be pressed together to firmly engage and hold any tool which may be placed between them, and by turning said screw out said jaws will separate.

The screw $d$ may be an ordinary thumb-screw.

The loop $c$ is movable along the jaws $a$ $b$ for a short distance, as represented by dotted lines, Fig. 1.

The jaws $a$ $b$ may be made as separate pieces and brazed or otherwise secured to the spring-acting loop-like handle, if desired.

I claim—

The universal detachable handle herein described, consisting of a pair of jaws $a$, $b$, on the ends of a loop-like spring-acting handle, a notch in the adjacent face of each jaw, extending lengthwise, and a hole at the rear end of said loop-like handle in line with said notches, a curved recess in the adjacent face of each jaw provided with teeth, the elongated loop $c$ embracing said jaws $a$, $b$, and the screw $d$ passing through said loop at one end which acts upon one of said jaws.

In testimony whereof I have signed my name to this specification in the presence of two subscribing witnesses.

EDWARD RIVETT.

Witnesses:
 B. J. NOYES,
 HARRY O. ROBINSON.